(12) United States Patent
Kilian et al.

(10) Patent No.: US 6,877,440 B1
(45) Date of Patent: Apr. 12, 2005

(54) SIDE REINFORCED BULK MATERIAL TRANSPORT CONTAINER

(75) Inventors: Kris Kilian, Floreat (AU); Vladimir Mazur, Floreat (AU)

(73) Assignee: Lynx Engineering Consultants Pty Ltd., West Perth (AU)

( * ) Notice: Subject to any disclaimer, the term of this patent is extended or adjusted under 35 U.S.C. 154(b) by 0 days.

(21) Appl. No.: 09/647,670

(22) PCT Filed: Mar. 30, 1999

(86) PCT No.: PCT/AU99/00237

§ 371 (c)(1),
(2), (4) Date: Nov. 20, 2000

(87) PCT Pub. No.: WO99/50157

PCT Pub. Date: Oct. 7, 1999

(30) Foreign Application Priority Data

Mar. 30, 1998 (AU) .............................. PP 2677

(51) Int. Cl.$^7$ ............................................ B61D 17/00
(52) U.S. Cl. .................................. 105/406.1; 104/247
(58) Field of Search .............................. 105/406.1, 416, 105/404, 238.1, 239, 244; 296/181, 182, 183, 184; 220/669, 770, 774, 775

(56) References Cited

U.S. PATENT DOCUMENTS

| 4,337,708 A | | 7/1982 | Peterson |
| 4,549,672 A | * | 10/1985 | Rinkewich .................. 220/671 |
| 4,608,931 A | | 9/1986 | Ruhmann et al. |
| 4,800,820 A | * | 1/1989 | Tomaka .................... 105/406.1 |
| 4,982,672 A | * | 1/1991 | Bell ........................... 110/346 |
| 5,154,302 A | | 10/1992 | Alcorn |
| 5,738,395 A | * | 4/1998 | Probst ........................ 220/315 |
| 5,860,366 A | * | 1/1999 | Lydic ......................... 105/416 |

FOREIGN PATENT DOCUMENTS

| CA | 2201041 | 1/2001 |
| WO | WO 83/01930 | 6/1983 |

OTHER PUBLICATIONS

The Fyansford quarry railway, Pearce, W A, 1974, Industrial Railway Record, No. 56, Oct., Industrial Railway Society (IRS), pp 305–309.

"Freight cars 70 ton hopper", 1953, Car Builders' Cyclopedia of American Practise, 19th edition, Association of American Railroads—Mechanical Division, Simmons–Boardman Publishing Corp, NY, USA, p. 227.

"Progress in railroad freight car engineering", Hawthorne, K L, 1983, American Society of Mechanical Engineers Rail Transportation Division (Publication) RTD, New York, NY, USA, pp 1–8.

"Use of aluminium on the railroad industry", Weiss, J C, Sauter, K L, , Roup, DD, 1994, Proceedings of the International Mechanical Engineering Congress and Exposition Nov. 6–11, Chicago, IL, USA, American Society of Mechanical Engineers, Rail Transportation Division (Publication) RTD, New York, NY, USA, pp 145–152.

(Continued)

Primary Examiner—S. Joseph Morano
Assistant Examiner—Robert J. McCarry, Jr.
(74) Attorney, Agent, or Firm—Baker & Daniels

(57) ABSTRACT

A container for transporting bulk material including two side walls, two end walls, and a base; the side walls including a plurality of vertical reinforcing members spaced along the length of the side wall, wherein the side wall between at least one adjacent pair of the reinforcing members includes at least one internal ridge running therebetween.

26 Claims, 7 Drawing Sheets

OTHER PUBLICATIONS

"Progress In railroad freight car engineering", Punwani, S K, 1989, Proceedings of the ASME Rail Transportation Conference, Dec. 10–15, San Francisco, CA, USA, American Society of Mechanical Engineers, Rail Transportation Division, New York, NY, USA, pp 141–155.

Effect of maintenance practices upon performance of freight car railroad trucks—progress report:, Hawthorne, V T, Sellberg, R P and Wronkiewicz, R D, 1990, Proceedings of the ASME/IEEE Joint Railroad Conference, Apr. 17–19, Chicago, IL, USA, ASME, Rail Transportation Division/IEEE/American Society of Civil Engineers, pp 1–12.

"Progress in railroad freight car engineering", Punwani, S K, 1997, Proceedings of the IEE/ASME Joint Railroad Conference Mar. 18–20, Boston, MA, USA, IEEE Publication, Piscataway, NJ, USA, pp 247–271.

"New freight cars which are run in by Russian plants", Mironov, N I et al, 1998, Tyazheloe Jan., Mashinostroenie, No. 1, pp 15–18.

"Slackless rotary dump drawbar system", Bartley, G.W., Altherr, R.G., Steffen, J.J., Kaufhold, H.T., 1989, Proceedings of the ASME Rail Transportation Conference, Dec. 10–15, San Francisco, CA, USA, American Society of Mechanical Engineers, Rail Transportation Division, New York, NY, USA, pp 123–134.

"Progress in Railroad Freight Car Engineering", Punwani, S.K., 1991, Proceedings of the ASME Meeting, Dec. 1–6, Atlanta, GA, USA, American Society of Mechanical Engineers, Rail Transportation Division, New York, NY, USA, pp 1–10.

"Freight cars: hopper", 1919, Car Builders' Dictionary and Cyclopedia, 9th edition, Master Car Builders' Association, pp 284–285, Simmons–Boardman Publishing Corp. NY, USA.

"Freight cars: Gondola; Drop End", 1953, Car Builders' Cyclopedia of American Practice, 19th edition, Association of American Railroads—Mechanical Division, Simmons–Boardman Publishing Corp, NY, USA, pp 170–171.

"Progress in railroad freight car engineering" Hawthorne, K L, 1983, American Society of Mechanical Engineers, Rail Transportation Division (Publication) RTD, New York, NY, USA, pp 1–8.

"Evolution in rail car designs for unit train coal service", Curtis, R D, 1989, Fourth international heavy haul railway conference: railways in action, Brisbane Sep. 11–15, 1989, preprints of papers, vol. 1, pp 239–243, IEAust.

"Types of freight rolling stock and their distribution", Bulkeley, G V 0, 1932, Chapter 2 of sexgoak Railway and Seaport Freight Movement: with examples of British and American Practice:, London, UK, The Technical Press, pp 13–23 of 222pp.

"Dial a Pump–Keeping Australia Clean".

"Car Builders' Cyclopedia", Seventeenth Edition, 1946, Association of American Railroads, Mechanical Division.

* cited by examiner

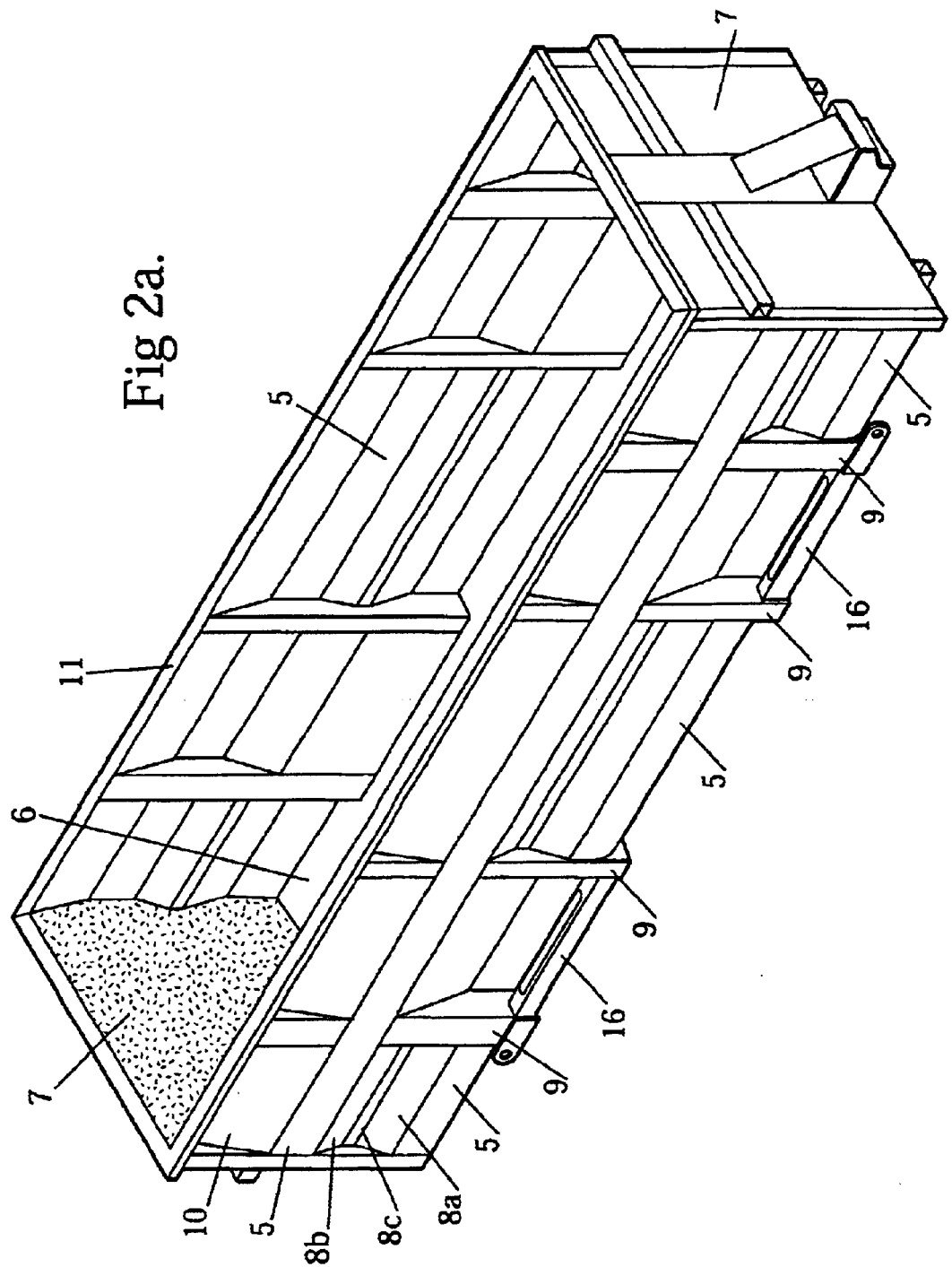

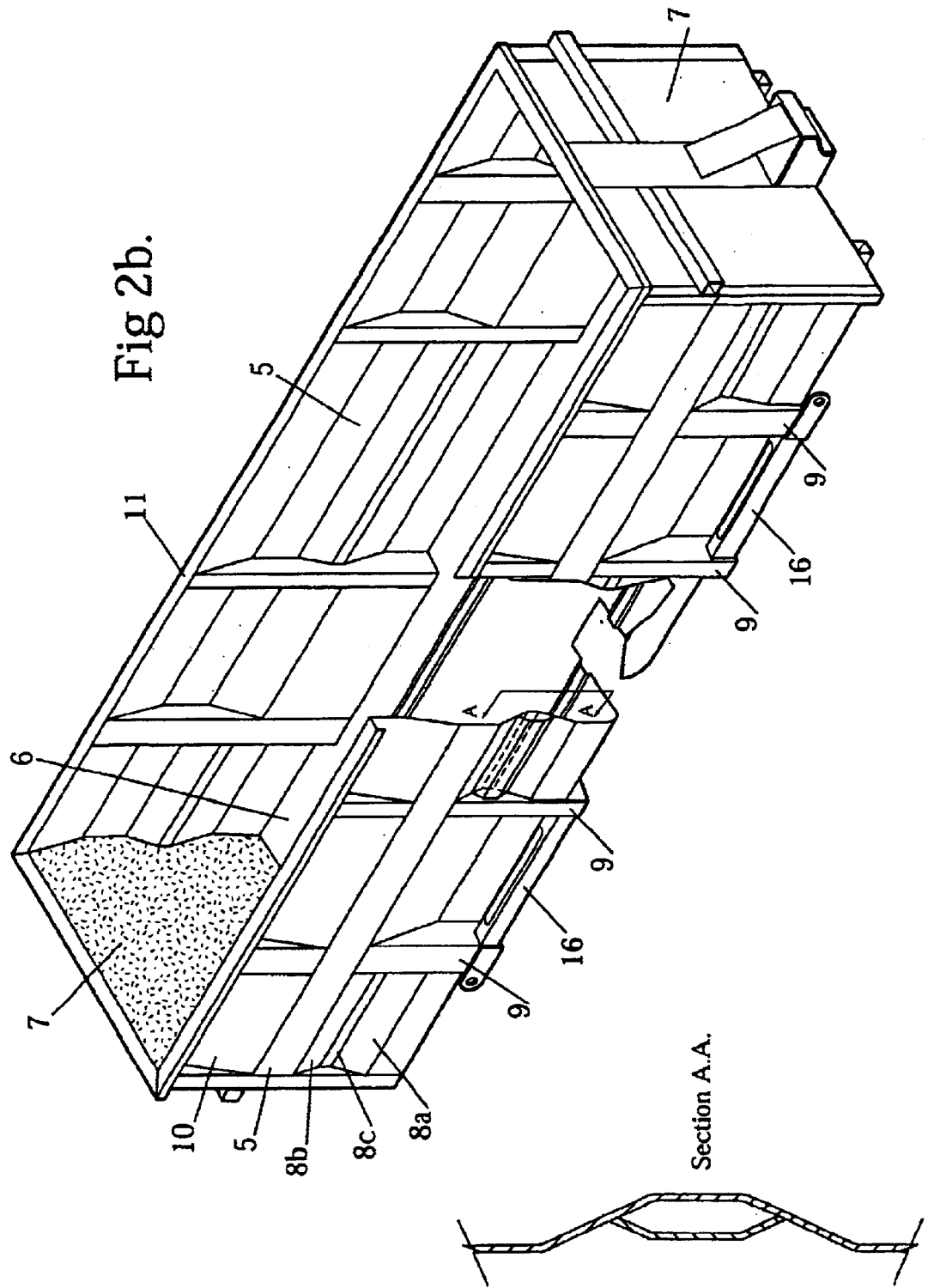

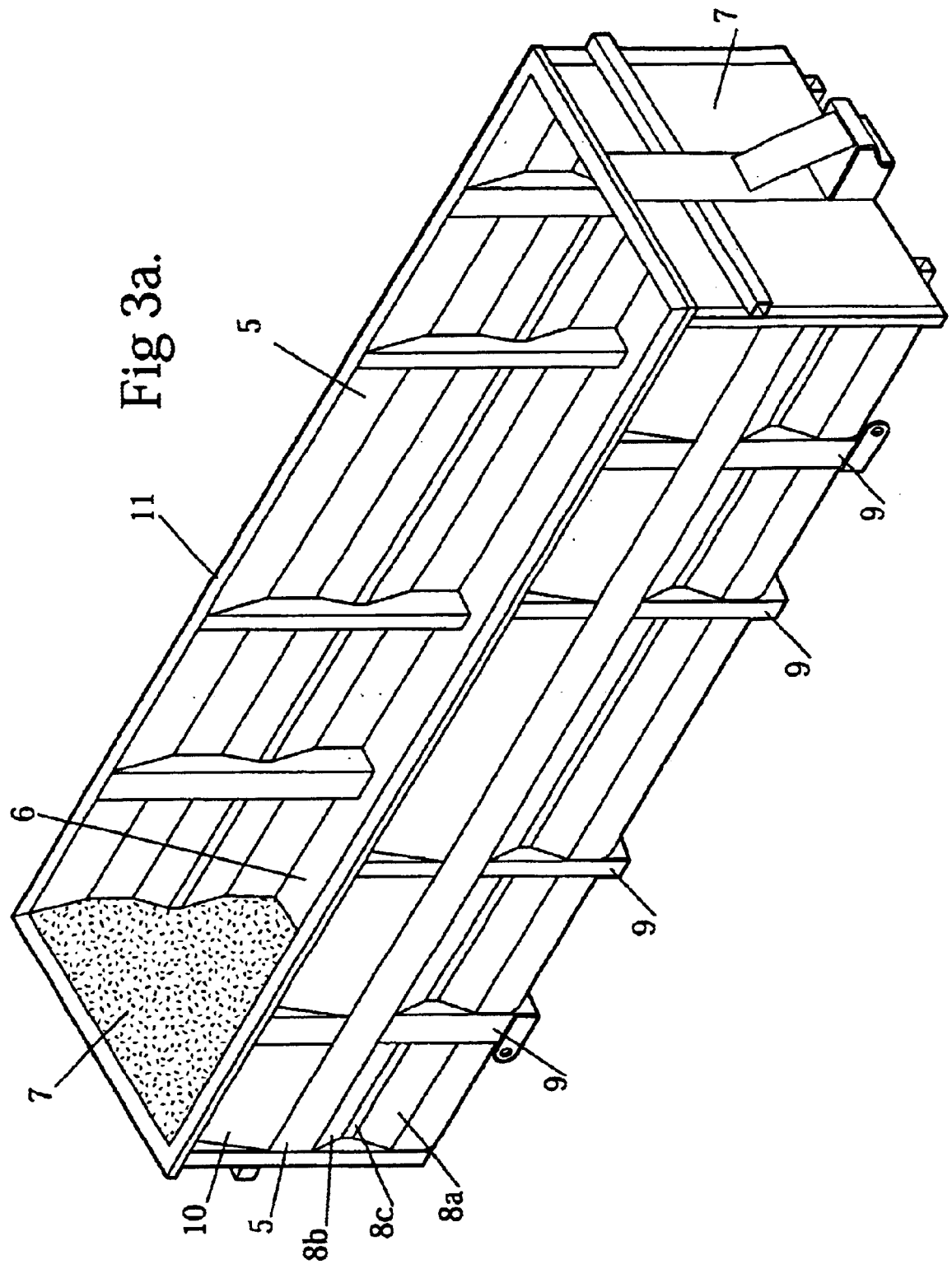

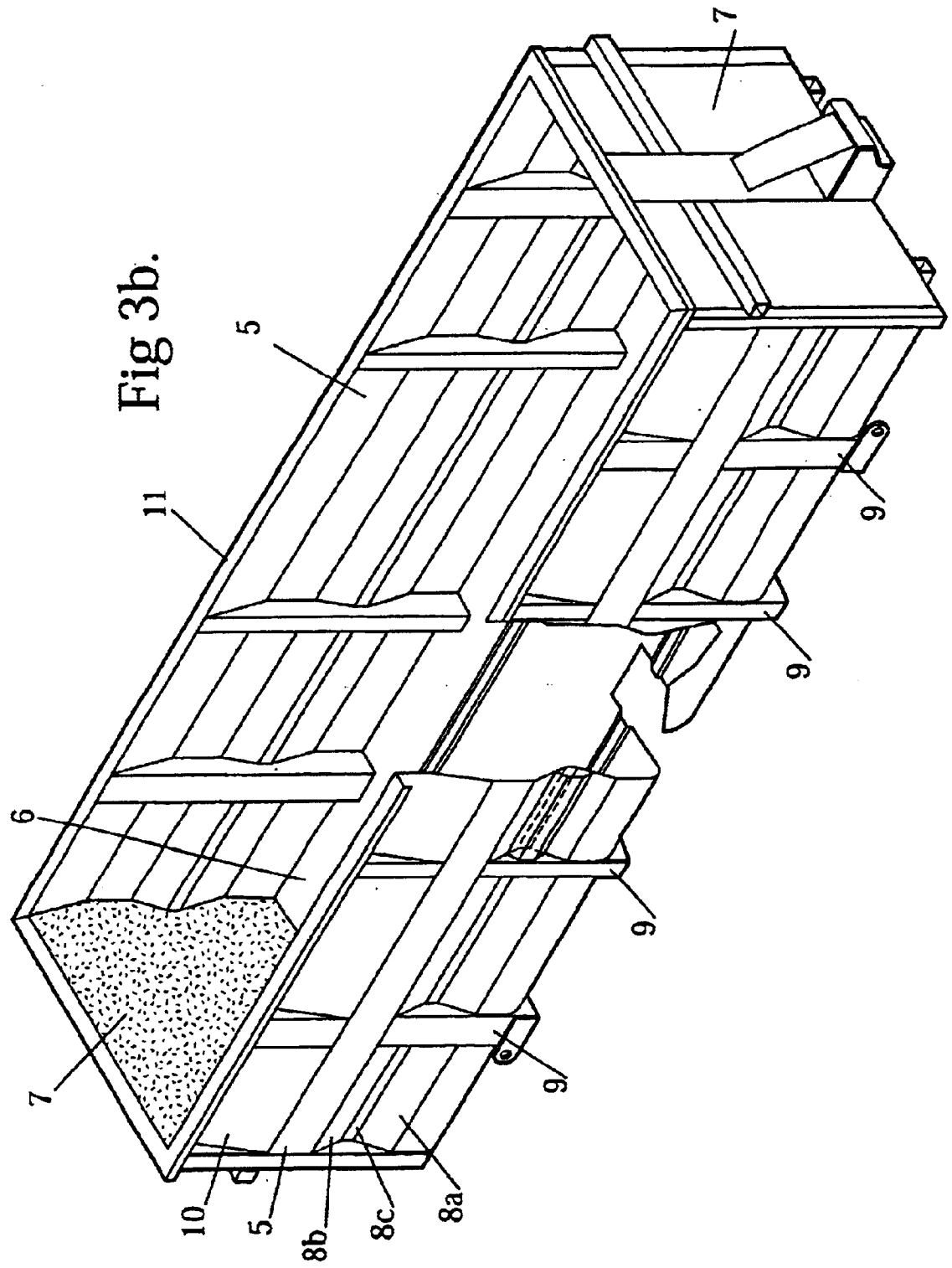

SIDE REINFORCED BULK MATERIAL TRANSPORT CONTAINER

The present invention is related to bulk transport containers, and in particular to containers used in road and rail transportation.

Bulk transport fleet operators presently use containers that are designed inefficiently and are unable to carry more payload than they are designed for without damaging the container, or without significantly affecting the containers safety and fatigue life. If such containers consistently carry more load than they are designed for, then unexpected structural failures are likely, along with a higher risk of derailment in the case of rail transportation.

The containers presently used by both Australian and international transportation companies to carry bulk product are based on designs that are at least 20 years old. Each new container that is produced is still based on these old concepts, such that the problems inherent in ageing containers will be duplicated in the new containers. Thus, if operators look to maximise the carrying capacity of their containers by increasing payloads the inherent design problems will be exacerbated.

It is an object of the present invention to provide a container for bulk product transportation that is more efficient and cost effective than existing containers.

With the above object in mind the present invention provides a container for transporting bulk material including two side walls, two end walls and a base, wherein at least one said side wall includes at least one ridge running along said at least one side wall between said end walls, and wherein said ridge is integrally formed within said at least one side wall.

Preferably, there will be at least one internal ridge between each of the reinforcing members.

Preferably, there will be at least one internal ridge between an end wall and a first reinforcing means.

In some instances extra reinforcing members might be required to satisfy the structural strength of any or all panels on the side wall and/or floor and/or end wall.

Ideally, the internal ridge includes a first wall portion angled from the wall towards the interior of the container, and a second wall portion rejoining the first wall portion to the wall. The angle of the first wall portion is in the direction of flow during unloading of the material to be transported.

Alternatively, the internal ridge includes a first wall portion deflected inwardly a progressively increased degree relative to the intersection of the side wall and the base, and a second wall portion extending from the first wall portion and being deflected outwardly a progressively decreased degree relative to the intersection of the side wall and the base.

The angle of the first wall portion may be determined by subtracting the natural angle of repose of the transported product, from the angle the container is rotated during unloading. Whilst the first and second wall portions may be symmetrical, they may also be of uneven length.

In further embodiments, the internal ridge may also include a third wall portion between the first wall portion and the second wall portion. This third wall portion may be flat or concave. Any such flat third wall portion may additionally be parallel to the side wall.

In some applications, a partial internal ridge may extend along the top edge or rim of the side walls. Such a partial internal ridge may consist of the first wall portion of the internal ridge. In this case an additional strengthening member along the edge or rim of the side wall would be included.

In a preferred embodiment, the base of the container also includes at least one internal ridge extending substantially along the length of the base.

It will be convenient to further describe the invention by reference to the accompanying drawings which illustrate possible embodiments of the invention and improvements over the prior art. Other embodiments of the invention are possible and consequently the particularity of the accompanying drawings is not to be understood as superseding the generality of the preceding description of the present invention.

FIG. 2a shows an isometric view of one container of the present invention.

FIG. 2b shows a similar container to that of FIG. 2a with a cutaway portion to better show the internal ridge.

FIG. 3a shows an isometric view of a further container of the present invention.

FIG. 3b shows a similar container to that of FIG. 3a with a cutaway portion to better show the internal ridge.

Figure 1:
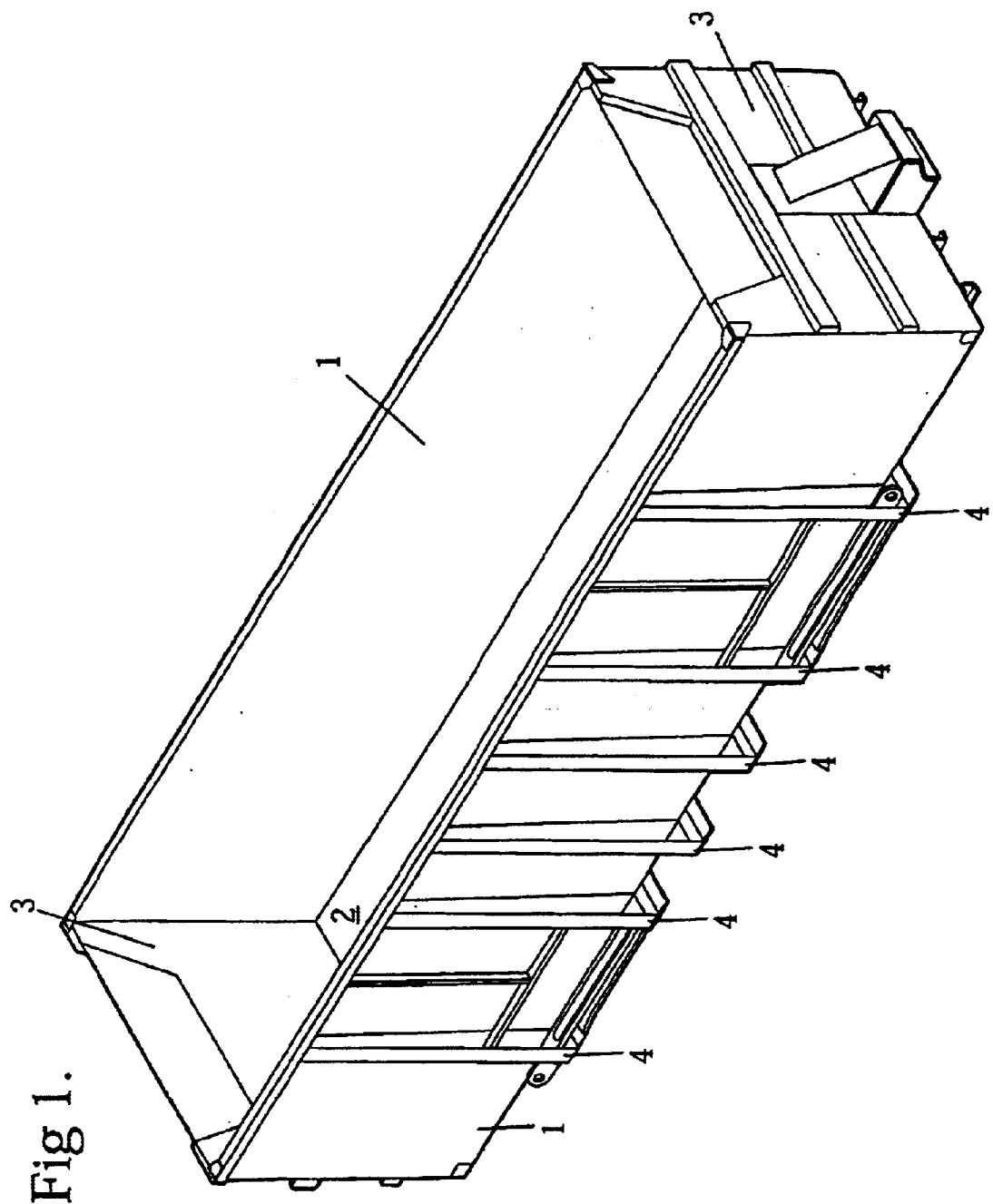
FIG. 1 shows an isometric view of a conventional container.
Figure 4A:
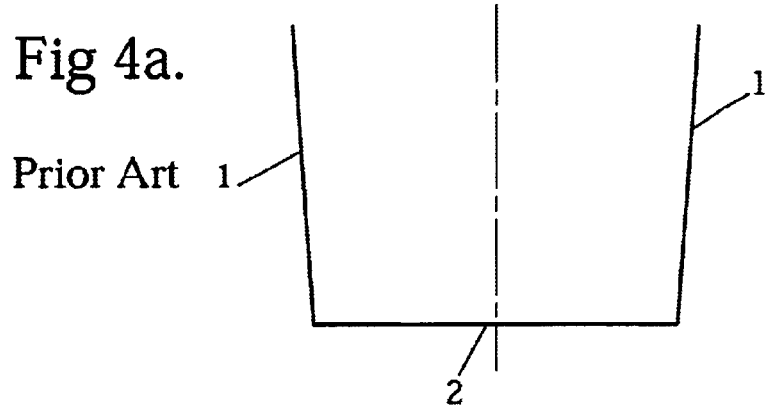
FIG. 4a shows a simple cross-sectional view of a conventional container.

Referring now to FIGS. 1 and 4a, the shape of a conventional container as presently used can be seen. The basic container includes two side walls 1, a base 2, and two end walls 3. The size of any such container, whether it be for transportation by road or by rail, has certain dimensional limitations. That is, neither the height, nor width, of the container can exceed pre-defined dimensions. These pre-defined dimensions are determined by both rail or road standards, and also, the practical limitations of loading and unloading facilities.

Accordingly, whilst it is presently desirable in the industry to increase payloads, the size of the actual containers cannot be increased without decreasing the strength of the containers. In this regard, it is noted that the walls of the containers do not extend to the maximum possible dimensions due to the structural requirements of the container. That is, the bulk product transported via these containers places extreme stresses on the walls of the containers, requiring a number of support or reinforcing members to strengthen the walls. This can conveniently take the form of a number of ribs 4, extending around the body of the container. The addition of the necessary number of ribs 4 to strengthen the walls 1, result in a much heavier container and in a resultant decrease in the aerodynamics of the container, having both fuel and cost implications on the profitability of the container. It is also noted that structural maintenance and repairs to such containers are both frequent and expensive and do not guarantee that the operational life of the container will be significantly increased.

It will be appreciated that larger containers will require more ribs or reinforcing members. The present invention reduces the number of ribs that is required when compared to a conventional container of equal size.

Figure 4B:
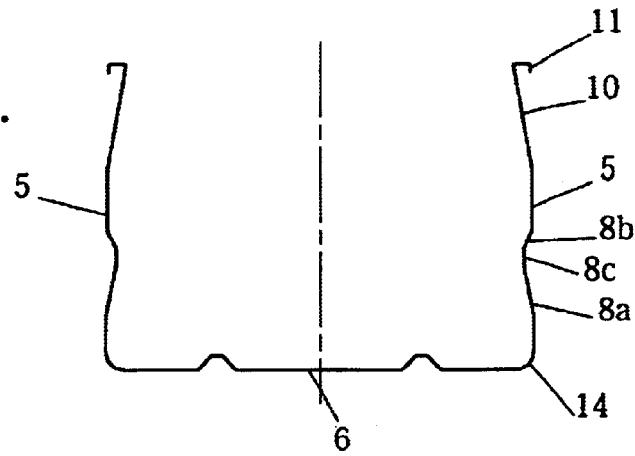
FIG. 4b shows a simple cross-sectional view of a container of the preferred embodiment of the present invention.

Referring now to FIGS. 2, 3 and 4b, the preferred embodiment of the present invention can be seen. The container of the preferred embodiment also includes two side walls 5, two end walls 7, and a base 6. However, the present invention also includes at least one internal ridge 8. The main element of this internal ridge 8, is a first portion 8a, which extends from the wall at an angle towards the interior of the container. A second portion 8b, can be adapted to complete the internal ridge 8, by rejoining the wall 5, to the end of the first portion 8a.

In some circumstances the ridge could be supplemented by extra reinforcing elements to add structural strength if required. That is, dependent on the material to be transported, it may also be desirable to add extra reinforcement to the internal ridge. This extra reinforcement may be added to the internal ridge between each strengthening rib, or alternatively, to the internal ridge in at least one of the wall sections. As seen in FIGS. 2b and 3b, this reinforcement may be shaped similar to that of the internal ridge.

It is noted that as we move along the first portion 8a from the side wall 5, the angle between the side wall 5 and the position on the first portion 8a relative to the intersection of the side wall 5 and base 6 progressively increases. Similarly, as we return along the second portion 8b, the angle relative to the intersection between the side wall 5 and base 6 progressively decreases.

The angle Ø1 at which the portion 8a, extends from the wall 5 towards the interior of the container is chosen to ensure that the product to be carried by the container is unloaded completely. That is, the angle is preferably dependent on the type of product carried and on the method the operator uses to unload the product. The dimensions of the internal ridge 8, are further determined as a function of the structural strength required and of the natural angle of repose of the material that is to be transported.

The angle at which the first portion 8a extends towards the interior of the container may preferably be determined by the following mathematical formula:

$$Ø1 \leq Ø2 - Ø3 - 90$$

where

Ø1—is the angle between the vertical wall 5, and the first portion 8a.

Ø2—is the angle the container is rotated in the unloading facility.

Ø3—is the natural angle of repose for the product to be transported.

Figure 7:
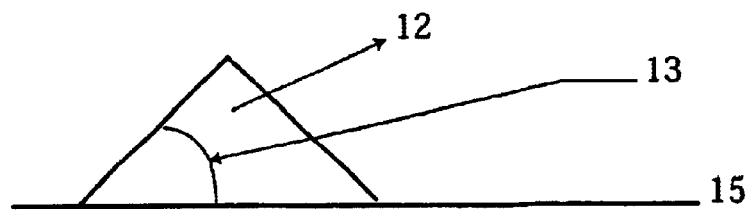
FIG. 7 shows the angle of repose diagrammatically.
Figure 8:
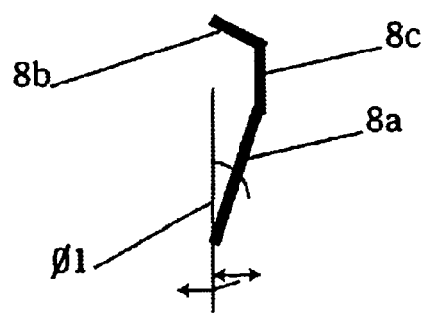
FIG. 8 shows an expanded view of an internal ridge of the present invention.

As seen in FIG. 7, the natural angle of repose 13 is dependent on the product 12 desired to be carried, and can be determined by pouring or dropping the material 12 onto a level plane so as to form a substantially conical hill. The angle of repose 13 is then determined as the angle between the horizontal plane 15, and a line extending from the base of the cone to the top of the hill.

In some circumstances, it may be more appropriate to use the following formula:

$$Ø1 \leq Ø2 - Ø3 - Ø4 - 90$$

where

Ø4—is the cohesion of the material to be transported when wet.

For a bottom dumping container 180° has to be added to the volume for Ø1. Alternatively, the formula may be amended by changing the −90° to +90°. In a further alternative Ø2 for a bottom dumping container may be considered to be 180°.

For a bottom dumping container, the ridge can be configured to extend away from the interior of the container.

Such an arrangement will not provide the same increased payload as a ridge which extends towards the interior of the container, but nevertheless, will provide substantial gains in cost reduction of fabrication from conventional containers which merely provide an additional strengthening member along the exterior of a standard container.

Essentially, the shape of the first portion 8a of the internal ridge 8 can be determined on the basis of the natural angle of repose 13 of the material which is to be carried. The second portion 8b will depend on the structural and manufacturing requirements of the container and may be derived from detailed structural analysis of the structural strength and stiffness requirements of the container. Whilst the second portion 8b may have a similar angle and length to the first portion 8a, this is not a requirement of the internal ridge. That is, the second portion 8b may be shaped differently to the first portion 8a, in that it may be curved, or flat. Alternatively, the length of the second portion 8b may be different to that of the first portion 8a, and accordingly the angle of the second portion 8b between the wall 5 and the second portion 8b will be different. The shape of the second portion 8b of the internal ridge 8 will depend on the limitations, such as space constraints, of the container, and on the number of internal ridges 8 in the wall 5, and to some degree on manufacturing facilities. Whereas the first portion 8a is based on the angle of repose 13 as discussed above, the second and possibly third portions 8b, 8c are chosen to complete the internal ridge 8, and fulfil the structural requirements of the container.

The length and shape of the internal ridge 8, will depend on the structural requirements of the side walls 5 and the base 6. It will also depend on the spacing between supporting frame members 9, and the natural angle of repose of the material. As the distance or spacing between the supporting frame members 9 increases, it will be necessary to increase the depth 16 of the internal ridge 8, to ensure the necessary structural strength. Accordingly, it is possible to design a container specifically for a certain type of material to be transported, by considering the mass of the material and the pressure the material will place on the walls of the container.

Figure 5:
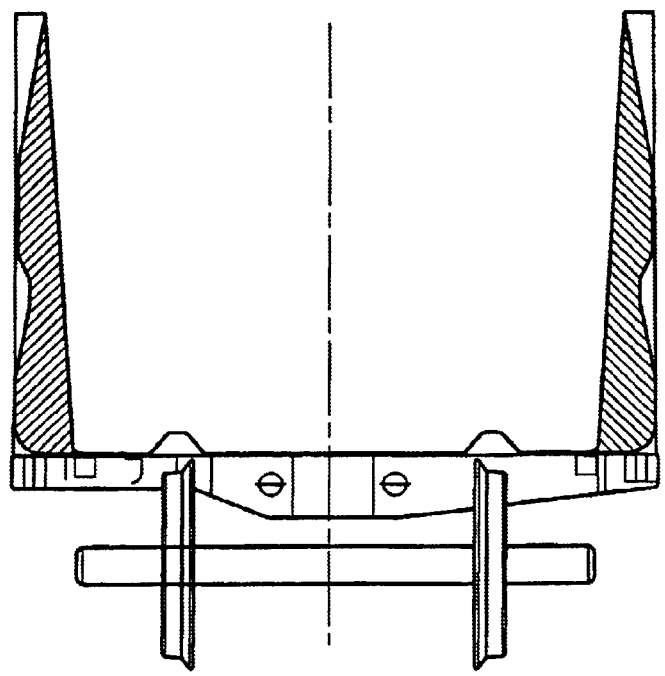
FIG. 5 shows a cross-sectional view of a container of the present invention superimposed over a conventional container.
Figure 6:
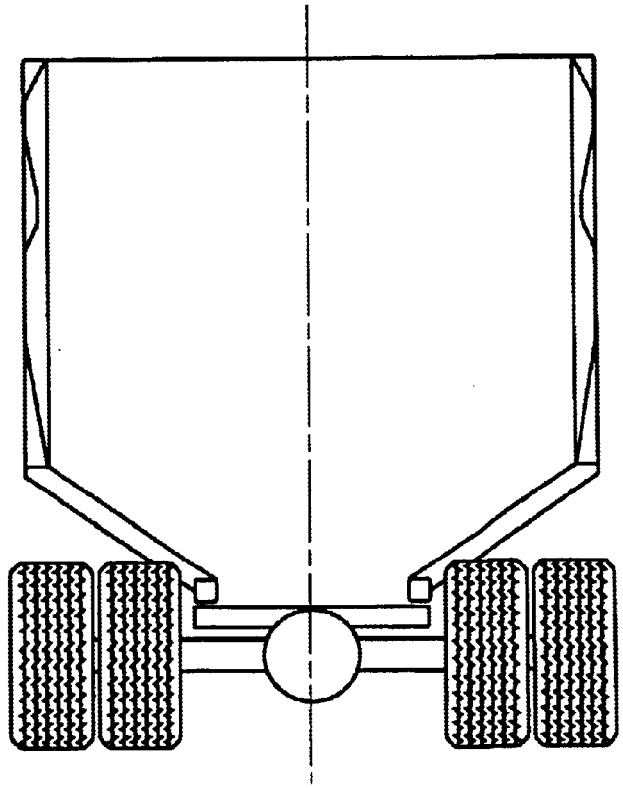
FIG. 6 shows the arrangement of the internal ridge for a container with a bottom dumping mechanism.

A container constructed with an internal ridge of the present invention provides a container that is able to transport bulk product. Furthermore, the internal ridge acts as an in-built longitudinal structural stiffener. This internal ridge, then ensures that the structural requirements, such as strength, fatigue resistance, and buckling capacity, are met, while ensuring that more product can be loaded into a container that has the same exterior dimensions as a conventionally designed container. This difference in carrying capacity can be seen in FIG. 5, where the shape of a new container of the present invention is superimposed over a conventional container. The shaded area of FIG. 5 shows the extra volume that may be loaded into the new container of the present invention.

The internal ridge 8 is designed to run along the length of the side wall 5 between the supporting frame members 9. Depending on the requirements of the container, for example the placement of locking members 16, the shape and design of the internal ridges 8 may vary between the supporting frame members 9, as seen in FIG. 2a. Alternatively, as shown in FIG. 3a the internal ridge 8 may be consistent in each panel of the side wall 5.

As can be seen from the figures, it is also preferable to include a partial internal ridge 10 at the top of the container. This partial internal ridge 10 may be formed by a first portion which extends at an angle towards the interior of the container. That is, the partial internal ridge 10 does not include the second portion of the internal ridge 8. Ideally, such a partial internal ridge 10 would also include an additional strengthening member 11 which forms the rim of the container. This rim 11 effectively compensates for the omission of the second portion of the internal ridge, thereby ensuring that the structural strength is sufficient. It will be understood that finite element analysis or other structural analysis can be used to determine the depth of the internal ridge and the thickness of the material to be used for the side wall of the container. Again the depth may be calculated depending on the spacing of the supporting frame members 9, and on the pressure exerted by the material to be carried. The exact figure is derived by applying strength of material theory as well as theories of structural mechanics.

The number and the placement of the internal ridges may be dependent upon the size of the container. As can be seen by a comparison of FIGS. 1 and 2, the addition of the internal ridge 8 reduces the number of strengthening ribs 4 required on a conventional container. This reduction in the number of ribs decreases the weight of the container, and also improves the aerodynamics of the container. Both these features result in a more cost effective container.

The internal ridge 8 may also include a third portion 8c which joins the first portion 8a to the second portion 8b. This third portion 8c may be used to further improve the structural requirements of the internal ridge 8. Accordingly, depending upon the application, this third portion 8c may be flat or concave. Further, it may run parallel to the wall 5, or extend at some angle relative to the wall 5. Generally, the longer the third portion 8c is, the stronger the internal ridge 8 is. However, if the third portion 8c is longer then the first portion 8a then some structural strength is lost, and accordingly it is desirable that the third portion 8c not exceed the length of the first portion 8a. Whether a third portion 8c is adopted will again depend on the required strength of the structure as well as any space constraints on the container.

The container of the present invention may be used for bulk transportation by either road or rail. It may also be adapted to be used on containers designed for rotary dumping or tipping, or for bottom dumping. The orientation of the internal ridge will depend upon this unloading method. That is the first portion 8a is always aligned with the flow of the product being unloaded so as to ensure that no product gets caught up inside the container. If the angle of the internal ridge is not designed so as to ensure that all the product was unloaded, it would be possible for trapped product to unbalance a container thought to be unloaded, thereby possibly causing derailment or collapsing of the container. It will also be understood that the base 6 of the container may also include at least one internal ridge, thereby strengthening the base of the container. The internal ridges running along the base of the container, may go over the wheels and extend through substantially the entire length of the container. Such floor ridges can be constructed having two main functions. One being operational, to bridge over the wheel thereby adding greater interior volume, and secondly structural as the ridge is again designed to provide structural strength. The parameters of the floor ridge are established using structural analysis. The height of the floor ridge is a function of the depth of the container, of the material properties of the product carried, and of the size of the wheels. The dimensions of the floor ridge will also depend on the spacing of the supporting members.

By the addition of at least one internal ridge in the wall of the container, the present invention results in a container that is lighter than conventional containers as the side wall containing the internal ridge does not require as many structural reinforcements as conventional containers, since the internal ridge itself adds to the structural strength of the wall. Again this can be seen by comparison of FIGS. 1 and 2, whereby the number of ribs or strengthening elements is less than in the original design. The decrease in the number of ribs 9 also leads to a cheaper container. The decrease in the number of vertical elements, and protruding pans generally improves the aerodynamic shape of the container, thereby making a more efficient and economical container. Further, because fewer welds are required the design ensures that there are fewer areas of stress concentration, thereby making the improved container more fatigue resistant.

As an example of the present invention, for a container designed to carry bulk ore from Mt Whaleback in Western Australia, the overall dimensions of the container could be:

Length=9.068 meters

Breadth=3.200 meters

Depth=2.278 meters

As to the ridge, assuming that the iron ore has a bulk density of 27.1 $KN/m^3$, an angle of repose of 35° and a side rotation of 137° for unloading, then the internal ridge characteristics could be as follows:

Ø1, the angle between the vertical wall 5 and the first portion of the ridge 8a, is calculated at 12°. Structured analysis has determined that the first internal ridge portion 8a ideally starts at a vertical height of 350 mm from the base; is angled inwards at 10 degrees (which is less that the calculated 12° to account for any adhesion of the material) and continues inwards until it reaches a vertical height of 800 mm from the base, which is equivalent to a 75 mm internal ridge depth. A third portion 8c is required of 95 mm vertical height and the second portion 8b joins the third portion 8c, to the vertical wall 5, finishing at an overall height of the completed ridge 1040 mm from the base.

Ideally, in the longest wall section an extra reinforcing member would also be added to the internal ridge to provide structural strength.

The main benefits of this design compared to existing bulk iron ore containers carrying the same stated ore are that the overall weight of the container is reduced by approximately 18% due to the improved structural efficiencies gained from the new structural wall and floor shape. Further, the payload of the improved container is increased by approximately 1% over that of a conventional container due to the increase in the container volume.

In addition, the aerodynamic characteristics of the shape reduce the drag coefficient on the side walls by 19% which will result in improved fuel economy for the operator.

In summary, the present invention provides a container that fits into the prescribed parameters, such as the maximum dimensional requirements, but still allows for an increased payload capacity without sacrificing structural strength. The more efficient structural design means that the container is lighter and more aerodynamic. Furthermore, the shape of the container is such that the product unloads easily and no product is left in the container after unloading operations. The angle and shape of the side walls and internal ridge are designed to take into consideration the products natural repose angle as well as the operators loading methodology, thereby ensuring that efficient unloading is achieved.

What is claimed is:

1. A wheeled road or railway bulk material transport vehicle comprising: a set of wheels; and a container supported on the wheels for holding the bulk material, said container having two side walls, two end walls and a base, wherein at least one said side wall includes a side wall portion and an integral ridge including first and second wall portions, said ridge running along said at least one side wall between said end walls, and wherein said ridge projects towards the interior of said container a distance greater than the thickness of said at least one side wall, and wherein the angle of said first wall portion of said ridge relative to said side wall portion is a function of the angle of repose of said bulk material such that said first wall portion is aligned with the flow of said bulk material during unloading of the bulk material from the container of the road or railway vehicle.

2. A wheeled road or railway bulk material transport vehicle as claimed in claim 1, wherein said internal ridge includes a fist wall portion deflected inwardly a progressively increased degree relative to the intersection of said side wall and said base, and a second wall portion extending from said first wall portion and being deflected outwardly a progressively decreased degree relative to the intersection of said side wall and said base.

3. A wheeled road or railway bulk material transport vehicle as claimed in claim 1 wherein said first wall portion extends from said side wall portion at an angle $\phi 1$, wherein:

$$\phi 1 \leq \phi 2 - \phi 3 - 90°$$

where:
- $\phi 1$—is the angle between said side wall portion and said first wall portion,
- $\phi 2$—is the angle said container is rotated during unloading of said container, and
- $\phi 3$—is the natural angle of repose of material to be transported in said container.

4. A wheeled road or railway bulk material transport vehicle as claimed in claim 1 wherein said first wall portion extends from said side wall portion at an angle $\phi 1$, wherein:

$$\phi 1 \leq \phi 2 - \phi 3 - \phi 4 - 90°$$

where:
- $\phi 1$—is the angle between said side wall portion and said first wall portion,
- $\phi 2$—is the angle said container is rotated during unloading of said container,
- $\phi 3$—is the natural angle of repose of material to be transported in said container, and
- $\phi 4$—is the cohesion of said material to be transported when wet.

5. A wheeled road or railway bulk material transport vehicle as claimed in claim 1 adapted for unloading of material through the base of the container, and wherein said first wall portion extends from said side wall portion at an angle $\phi 1$, wherein:

$$\phi 1 \leq 90° - \phi 3$$

- $\phi 1$—is the angle between said side wall portion and said first wall portion, and
- $\phi 3$—is the natural angle of repose of material to be transported in said container.

6. A wheeled road or railway bulk material transport vehicle as claimed in claim 1 adapted for unloading of material through the base container, and wherein said first wall portion extends from said side wall portion at an angle $\phi 1$, wherein:

$$\phi 1 \leq 90° - \phi 3 - \phi 4$$

where:
- $\phi 1$—is the angle between said side wall portion and said first wall portion,
- $\phi 3$—is the natural angle of repose of material to be transported in said container, and
- $\phi 4$—is the cohesion of said material to be transported when wet.

7. A wheeled road or railway bulk material transport vehicle as claimed in claim 1 wherein said first and second wall portions are symmetrical.

8. A wheeled road or railway bulk material transport vehicle as claimed in claim 1 wherein said second wall portion is convex or concave relative to the interior of the container.

9. A wheeled road or railway bulk material transport vehicle as claimed in claim 1, wherein said ridge further includes a third wall portion between said first wall portion and said second wall portion.

10. A wheeled road or railway bulk material transport vehicle as claimed in claim 9 wherein said third wall portion is concave.

11. A wheeled road or railway bulk material transport vehicle as claimed in claim 9 wherein said third wall portion is flat or straight.

12. A wheeled road or railway bulk material transport vehicle as claimed in claim 11 wherein said third wall portion is parallel to said side wall portion.

13. A wheeled road or railway bulk material transport vehicle as claimed in claim 11 wherein said third wall portion is angled relative to said side wall portion.

14. A wheeled road or railway bulk material transport vehicle as claimed in claim 9 wherein said first wall portion is equal to or longer than said third wall portion.

15. A wheeled road or railway bulk material transport vehicle as claimed in claim 1, wherein at least one said side wall further includes a partial ridge along the top or rim of said at least one side wall, said partial ridge being formed by a fourth wall portion, said fourth wall portion being equivalent to said first wall portion.

16. A wheeled road or railway bulk material transport vehicle as claimed in claim 15, wherein said fourth wall portion is of equal length to said first wall portion.

17. A wheeled road or railway bulk material transport vehicle as claimed in claim 15 wherein said partial ridge further includes a strengthening member along the periphery of said fourth wall portion, said strengthening member forming the rim of said container.

18. A wheeled road or railway bulk material transport vehicle as claimed in claim 17, wherein said strengthening member is integrally formed within said at lease one side wall.

19. A wheeled road or railway bulk material transport vehicle as claimed in claim 1 wherein said base of said container includes at least one ridge extending substantially along the length of said base.

20. A wheeled road or railway bulk material transport vehicle as claimed in claim 19 wherein said at least one ridge along said base is located about wheel or track positions of a support for said container.

21. A wheeled road or railway bulk material transport vehicle as claimed in claim 1 for use in transportation of bulky material by road.

22. A wheeled road or railway bulk material transport vehicle as claimed in claim 1 for use in transportation of bulk material by rail.

23. A wheeled road or railway bulk material transport vehicle comprising: a set of wheels; and a container sup ported on the wheels for holding the bulk material, said container having two side walls, two end walls, and a base; wherein at least one said side wall includes a side wall portion and a plurality of vertical reinforcing members spaced along the length of said side wall, wherein said side wall between at least one adjacent pair of said reinforcing members includes at least one integral ridge running therebetween, said ridge including first and second wall portions and projecting towards the interior of said container a distance greater than the thickness of said at least one side wall, and wherein the angle of said first wall portion of said ridge relative to said side wall portion is a function of the angle of repose of the said bulk material such that said first wall portion is aligned with the flow of said bulk material during unloading of the bulk material from the container of the road or railway vehicle.

24. A wheeled road or railway bulk material transport vehicle as claimed in claim 23 further including at least one said ridge between each of said reinforcing members.

25. A wheeled road or railway bulk material transport vehicle as claimed in claim 23 including additional reinforcement aligned along each said ridge between each of said reinforcing members.

26. A wheeled road or railway bulk material transport vehicle as claimed in claim 23, further including at least one said ridge between said end wall and a first reinforcing member.

* * * * *

UNITED STATES PATENT AND TRADEMARK OFFICE
CERTIFICATE OF CORRECTION

PATENT NO. : 6,877,440 B1
DATED : April 12, 2005
INVENTOR(S) : Kilian et al.

It is certified that error appears in the above-identified patent and that said Letters Patent is hereby corrected as shown below:

Column 7,
Line 13, delete "fist" and insert -- first --.
Lines 23, 36, 53 and 65, delete "$\leqq$" and insert -- $\leq$ --.

Column 8,
Line 50, delete "lease" and insert -- least --.
Line 67, delete "sub" and insert -- sub- --.

Signed and Sealed this

Twelfth Day of July, 2005

JON W. DUDAS
*Director of the United States Patent and Trademark Office*